(12) United States Patent
Peters et al.

(10) Patent No.: US 12,101,348 B2
(45) Date of Patent: *Sep. 24, 2024

(54) SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM

(71) Applicant: Expel, Inc., Herndon, VA (US)

(72) Inventors: Matt Peters, Herndon, VA (US); Peter Silberman, Rockville, MD (US); Dan Whalen, Herndon, VA (US); Elisabeth Weber, Herndon, VA (US); Jon Hencinski, Herndon, VA (US); John Begeman, Herndon, VA (US)

(73) Assignee: Expel, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,285

(22) Filed: Apr. 11, 2023

(65) Prior Publication Data

US 2023/0247046 A1 Aug. 3, 2023

Related U.S. Application Data

(63) Continuation of application No. 17/672,140, filed on Feb. 15, 2022, now Pat. No. 11,658,999, which is a
(Continued)

(51) Int. Cl.
*H04L 9/40* (2022.01)
*G06F 9/54* (2006.01)
(Continued)

(52) U.S. Cl.
CPC .......... *H04L 63/1441* (2013.01); *G06F 9/547* (2013.01); *G06N 5/022* (2013.01); *G06N 5/04* (2013.01); *H04L 63/1416* (2013.01)

(58) Field of Classification Search
CPC . H04L 63/1441; H04L 63/1416; G06F 9/547; G06N 5/022; G06N 5/04
See application file for complete search history.

(56) References Cited

U.S. PATENT DOCUMENTS

9,306,965 B1 4/2016 Grossman et al.
9,386,041 B2 7/2016 Carver et al.
(Continued)

*Primary Examiner* — Beemnet W Dada
(74) *Attorney, Agent, or Firm* — Chandler Scheitlin; Padowithz Alce; ALCE PLLC (57) ABSTRACT

A cybersecurity system and method for handling a cybersecurity event includes identifying a cybersecurity alert; selectively initializing automated threat intelligence workflows based on computing a cybersecurity alert type, wherein the automated threat intelligence workflows include a plurality of automated investigative tasks that, when executed by one or more computers, derive cybersecurity alert intelligence data; and executing the plurality of automated investigative tasks includes automatically sourcing a corpus of investigative data; deriving the cybersecurity alert intelligence data based on extracting selective pieces of data from the corpus of investigative data, wherein the cybersecurity alert intelligence data informs an inference of a cybersecurity alert severity of the cybersecurity alert; and automatically routing the cybersecurity alert to one of a plurality of distinct threat mitigation or threat disposal routes based on the cybersecurity alert severity of the cybersecurity alert.

20 Claims, 4 Drawing Sheets

Related U.S. Application Data continuation of application No. 17/488,800, filed on Sep. 29, 2021, now Pat. No. 11,303,666.

(60) Provisional application No. 63/091,409, filed on Oct. 14, 2020.

(51) Int. Cl.
*G06N 5/022* (2023.01)
*G06N 5/04* (2023.01)

(56) References Cited

U.S. PATENT DOCUMENTS

| | | |
|---|---|---|
| 9,582,662 B1 | 2/2017 | Messick et al. |
| 10,867,034 B2 | 12/2020 | Martin et al. |
| 10,873,596 B1 | 12/2020 | Bourget et al. |
| 10,902,114 B1 | 1/2021 | Trost et al. |
| 2015/0215334 A1 | 7/2015 | Bingham et al. |
| 2016/0164894 A1* | 6/2016 | Zeitlin ............... H04L 63/1416 726/23 |
| 2018/0159876 A1 | 6/2018 | Park et al. |
| 2020/0314141 A1 | 10/2020 | Vajipayajula et al. |
| 2020/0327223 A1 | 10/2020 | Sanchez et al. |
| 2020/0329072 A1 | 10/2020 | Dubois et al. |
| 2021/0168175 A1 | 6/2021 | Crabtree et al. |

* cited by examiner

```
┌─────────────────────────────────────────────────────────────┐
│   SOURCING SECURITY ALERT DATA AND IDENTIFYING LIKELY       │
│              SECURITY ALERTS S210                           │
└─────────────────────────────────────────────────────────────┘

┌─────────────────────────────────────────────────────────────┐
│  IDENTIFYING AN AUTOMATED INVESTIGATION WORKFLOW BASED      │
│       ON VALIDATED SECURITY ALERT DATA S220                 │
└─────────────────────────────────────────────────────────────┘

┌─────────────────────────────────────────────────────────────┐
│   EXECUTING THE AUTOMATED INVESTIGATION WORKFLOW AND        │
│      BUILDING A CORPUS OF INVESTIGATIVE DATA S230           │
└─────────────────────────────────────────────────────────────┘

┌─────────────────────────────────────────────────────────────┐
│  AUTOMATICALLY CREATING THREAT INTELLIGENCE DATA AND        │
│     CREATING THREAT RESPONSE COLLATERAL S240                │
└─────────────────────────────────────────────────────────────┘

┌─────────────────────────────────────────────────────────────┐
│    IDENTIFYING A ROUTING FOR DISPOSING A CYBERSECURITY      │
│                     THREAT S250                             │
└─────────────────────────────────────────────────────────────┘
```

SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM

CROSS-REFERENCE TO RELATED APPLICATIONS

This application is a continuation of U.S. patent application Ser. No. 17/672,140, filed 15 Feb. 2022, which is a continuation of U.S. Pat. No. 11,303,666, filed 29 Sep. 2021, which claims the benefit of U.S. Provisional Application No. 63/091,409, filed 14 Oct. 2020, which are incorporated herein their entireties by this reference.

TECHNICAL FIELD

This invention relates generally to the cybersecurity field, and more specifically to a new and useful cyber threat detection and mitigation system and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security risks posed by malicious actors or uneducated insiders appear to grow at an incalculable rate because of the complexity of configuring cloud-based services, their ease of access, and the speed at which cloud base services allow users to move.

Thus, security operation services may be tasked with intelligently identifying the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slowdown the detection of security threats and efficiently responding to detected security threats.

Thus, there is a need in the cybersecurity field to create improved systems and methods for intelligently scaling detection capabilities of a security operations service while maintaining quality and improving its technical capabilities to efficiently respond to an increasingly large volume of security risks to computing and organizational computing assets.

The embodiments of the present application described herein provide technical solutions that address, at least the need described above.

BRIEF SUMMARY OF THE INVENTION(S)

In one embodiment, a method for detecting a cybersecurity threat and automatically generating cybersecurity threat intelligence for mitigating the cybersecurity threat includes identifying a cybersecurity threat based on one or more streams of event data from one or more external data sources associated with a subscriber; selectively initializing one or more automated threat intelligence workflows of a plurality of distinct automated threat intelligence workflows based on computing a cybersecurity threat type of the cybersecurity threat, wherein the one or more automated threat intelligence workflows include an ensemble of automated investigative tasks defined for the cybersecurity threat type that, when executed by one or more computers, derive cybersecurity threat intelligence data for handling the cybersecurity threat; and executing the ensemble of automated investigative tasks includes automatically creating one or more API calls to a subset of the one or more external data sources based on the cybersecurity threat type of the cybersecurity threat; deriving the cybersecurity threat intelligence data based on extracting selective pieces of data from a corpus of investigative data returned responsive to the one or more API calls, wherein the cybersecurity threat intelligence data informs an inference of a cybersecurity threat severity of the cybersecurity threat; and automatically routing the cybersecurity threat to one of a plurality of distinct threat mitigation or threat disposal routes based on the cybersecurity threat severity of the cybersecurity threat.

In one embodiment, identifying the cybersecurity threat includes: extracting threat feature data from the corpus of investigation data, wherein the corpus of investigation data comprises a subset of data from the one or more streams of event data; evaluating the threat feature data against one or more threat identifying heuristics; and computing whether the threat feature data satisfy criteria of the one or more threat identifying heuristics.

In one embodiment, identifying the cybersecurity threat includes: extracting threat feature data from the corpus of investigation data, wherein the corpus of investigation data comprises a subset of data from the one or more streams of event data; converting the threat feature data to a set of threat feature vectors; and predicting, by one or more cybersecurity threat machine learning models, a threat classification of one of the cybersecurity threat or not a cybersecurity threat based on an input of the set of threat feature vectors.

In one embodiment, selectively initializing the one or more automated threat intelligence workflows includes: identifying a reference mapping between each of a plurality of distinct cybersecurity threat types and a plurality of distinct automated threat intelligence workflows; and identifying the one or more automated threat intelligence workflows for the cybersecurity threat based on evaluating the cybersecurity threat type against the reference mapping.

In one embodiment, selectively initializing one or more automated threat intelligence workflows includes: identifying a reference mapping between each of a plurality of distinct cybersecurity threats and one or more distinct automated threat intelligence workflows; and identifying the one or more automated threat intelligence workflows for the cybersecurity threat based on performing a search of the reference mapping using the cybersecurity threat type of the cybersecurity threat.

In one embodiment, the cybersecurity threat severity relates to a likelihood or an estimation that the cybersecurity includes one or more of a malicious attack, a compromise of one or more of the computing systems of a subscriber, and a violation of computer security policy of the subscriber.

In one embodiment, the method includes computing the cybersecurity threat severity for the cybersecurity threat, wherein computing the cybersecurity threat severity includes: extracting threat severity feature data from the cybersecurity threat intelligence data, wherein the threat severity feature data comprises one or more pieces of data that are probative of a severity of the cybersecurity threat; and implementing a threat severity machine learning model that computes the inference of the cybersecurity threat severity for the cybersecurity threat based on an input of vectors of the extracted threat severity feature data.

In one embodiment, the method includes computing the cybersecurity threat type of the cybersecurity threat includes: extracting cybersecurity threat feature data from the cybersecurity threat intelligence data, wherein the cybersecurity threat feature data comprises one or more pieces of data that are probative of a threat classification of the cybersecurity threat; and implementing a threat classification machine learning model that predicts a threat classification label for the cybersecurity threat that indicates a type of cybersecurity threat from among a plurality of distinct possible types of cybersecurity threats based on an input of vectors of the extracted cybersecurity threat feature data.

In one embodiment, creating the one or more API calls to the subset of the one or more external data sources includes: identifying data requirements for building the corpus of investigative data for the cybersecurity threat type of the cybersecurity threat, identifying API call configuration parameters for each data source of the investigative data, and automatically configuring the one or more API calls based on the API call configuration parameters.

In one embodiment, the cybersecurity intelligence data relates to a collection of informative or probative pieces of data selectively extracted from the corpus of investigation data that satisfy one or more investigative criteria for substantiating a distinct cybersecurity threat type.

In one embodiment, the method includes constructing threat response collateral based on the cybersecurity intelligence data, wherein constructing the threat response collateral includes composing a threat intelligence report by: automatically interleaving a selected subset of the cybersecurity threat intelligence data into one or more distinct threat data locations within one or more parts of the threat intelligence report.

In one embodiment, constructing the threat response collateral further includes composing the threat intelligence report by: automatically creating one or more illustrative threat graphics of the cybersecurity threat based on a distinct selected subset of the cybersecurity threat intelligence data, and merging the one or more illustrative threat graphics into distinct threat data locations within the one or more parts of the threat intelligence report.

In one embodiment, automatically routing the cybersecurity threat includes routing the cybersecurity threat to a threat escalation route of the plurality of distinct threat mitigation or threat disposal routes if the cybersecurity threat metric satisfies a threat escalation threshold.

In one embodiment, automatically routing the cybersecurity threat includes routing the cybersecurity threat to a threat de-escalation route of the plurality of distinct threat mitigation or threat disposal routes if the cybersecurity threat metric satisfies a threat de-escalation threshold.

In one embodiment, a cybersecurity system that implements a cybersecurity service for rapidly detecting and mitigating a cybersecurity threat or a cybersecurity attack includes a cybersecurity threat identification system implemented by one or more computers that: identifies a cybersecurity threat based on one or more streams of event data from one or more external data sources associated with a subscriber; selectively initializes one or more automated threat intelligence workflows of a plurality of distinct automated threat intelligence workflows based on computing a cybersecurity threat type of the cybersecurity threat, wherein the one or more automated threat intelligence workflows include an ensemble of automated investigative tasks defined for the cybersecurity threat type that, when executed by one or more computers, derive cybersecurity threat intelligence data for handling the cybersecurity threat; and an automated threat intelligence workflow system implemented by at least one of the one or more computers that: executes the ensemble of automated investigative tasks includes automatically creating one or more API calls to a subset of the one or more external data sources based on the cybersecurity threat type of the cybersecurity threat; derives the cybersecurity threat intelligence data based on extracting selective pieces of data from a corpus of investigative data returned responsive to the one or more API calls, wherein the cybersecurity threat intelligence data informs an inference of a cybersecurity threat severity of the cybersecurity threat; and automatically routes the cybersecurity threat to one of a plurality of distinct threat mitigation or threat disposal routes based on the cybersecurity threat severity of the cybersecurity threat.

In one embodiment, selectively initializing the one or more automated threat intelligence workflows includes: identifying a reference mapping between each of a plurality of distinct cybersecurity threat types and a plurality of distinct automated threat intelligence workflows; and identifying the one or more automated threat intelligence workflows for the cybersecurity threat based on evaluating the cybersecurity threat type against the reference mapping.

In one embodiment, the cybersecurity threat severity relates to a likelihood or an estimation that the cybersecurity includes one or more of a malicious attack, a compromise of one or more of the computing systems of a subscriber, and a violation of computer security policy of the subscriber.

In one embodiment, the cybersecurity threat identification system further: computes the cybersecurity threat type of the cybersecurity threat by: extracting cybersecurity threat feature data from the cybersecurity threat intelligence data, wherein the cybersecurity threat feature data comprises one or more pieces of data that are probative of a threat classification of the cybersecurity threat; and implementing a threat classification machine learning model that predicts a threat classification label for the cybersecurity threat that indicates a type of cybersecurity threat from among a plurality of distinct possible types of cybersecurity threats based on an input of vectors of the extracted cybersecurity threat feature data.

In one embodiment, automatically routing the cybersecurity threat includes: (1) routing the cybersecurity threat to a threat escalation route of the plurality of distinct threat mitigation or threat disposal routes if the cybersecurity threat metric satisfies a threat escalation threshold, or (2) routing the cybersecurity threat to a threat de-escalation route of the plurality of distinct threat mitigation or threat disposal routes if the cybersecurity threat metric satisfies a threat de-escalation threshold.

In one embodiment, a cybersecurity method for handling a cybersecurity alert includes identifying a cybersecurity alert based on one or more streams of event data from one or more external data sources; selectively initializing one or more automated threat intelligence workflows of a plurality of distinct automated threat intelligence workflows based on computing a cybersecurity alert type of the cybersecurity alert, wherein the one or more automated threat intelligence workflows include a plurality of automated investigative tasks defined for handling the cybersecurity alert type that, when executed by one or more computers, derive cybersecurity alert intelligence data; and executing the plurality of automated investigative tasks includes automatically sourcing a corpus of investigative data; deriving the cybersecurity alert intelligence data based on extracting selective pieces of data from the corpus of investigative data, wherein the cybersecurity alert intelligence data informs an inference of a cybersecurity alert severity of the cybersecurity alert; and automatically routing the cybersecurity alert to one of a plurality of distinct threat mitigation or threat disposal routes based on the cybersecurity alert severity of the cybersecurity alert.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

Figure 1:
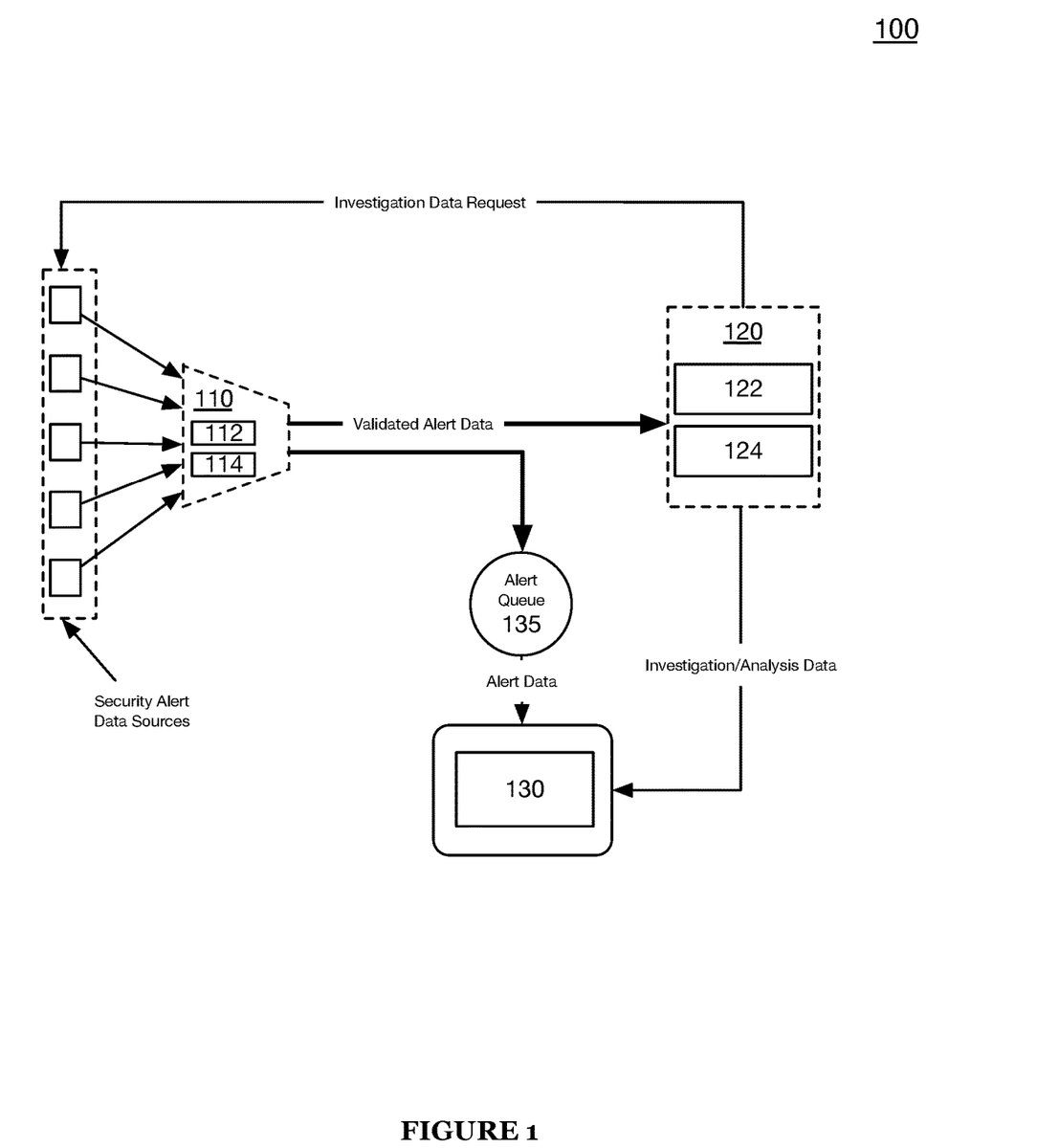
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100.

The system 100 may function to enable real-time cybersecurity threat detection, agile, and intelligent threat response for mitigating detected security threats.

1.1 Security Alert Engine [Josie]

The security alert aggregation and identification module 110, sometimes referred to herein as the "security alert engine 110" may be in operable communication with a plurality of distinct sources of cyber security alert data. In one or more embodiments, the module 110 may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine 110 may include a security threat detection logic module 112 that may function to assess inbound security alert data using predetermined security detection logic that may validate or substantiate a subset of the inbound alerts as defining or informing security threats requiring triage, an escalation, an investigation, and/or a threat mitigation response by the system 100 and/or by a subscriber to the system 100.

Additionally, or alternatively, the security alert engine 100 may function as a normalization layer for inbound security alerts from the plurality of distinct source of security alert data by normalizing all alerts into a predetermined alert format regardless of the native format of the event data or alert data.

1.1.1 Security Alert Machine Learning Classifier

Optionally, or additionally, the security alert engine 110 may include a security alert machine learning system 114 that may function to classify inbound security alerts or events as validated or not validated security alerts, as described in more detail herein.

The security alert machine learning system 114 may implement a single machine learning algorithm or an ensemble of machine learning algorithms that operate to predict or classify threat events or non-threat events. Additionally, the security alert machine learning system 114 may be implemented by the one or more computing servers, a distributed network of computers (e.g., a cloud network), computer processors, and the like of the system 100.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof.

However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Extensible Automated Investigations Engine [Ruxie]

The automated security investigations engine 120, which may be sometimes referred to herein as the "investigations engine 120", preferably functions to automatically perform investigative tasks for addressing a security task, a security event, and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label. That is, in such embodiments, one or more of the plurality of automated investigation workflows may be mapped to at least one of a plurality of distinct validated security alerts or events, such that a detection of the validated security alert or event automatically causes an execution of a mapped or associated automated investigation workflow.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3. Security Mitigation User Interface [Workbench]

The security mitigation user interface 130 may function to enable an analyst or an administrator to perform, in a parallel manner, monitoring, investigations, and reporting of security events, incidents, and/or resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible, via the Internet or the like, to a subscribing entity.

Accordingly, in or more embodiments, a system user (e.g., an analyst) or an administrator (e.g., one or more computing servers or the like) implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

Figure 2:
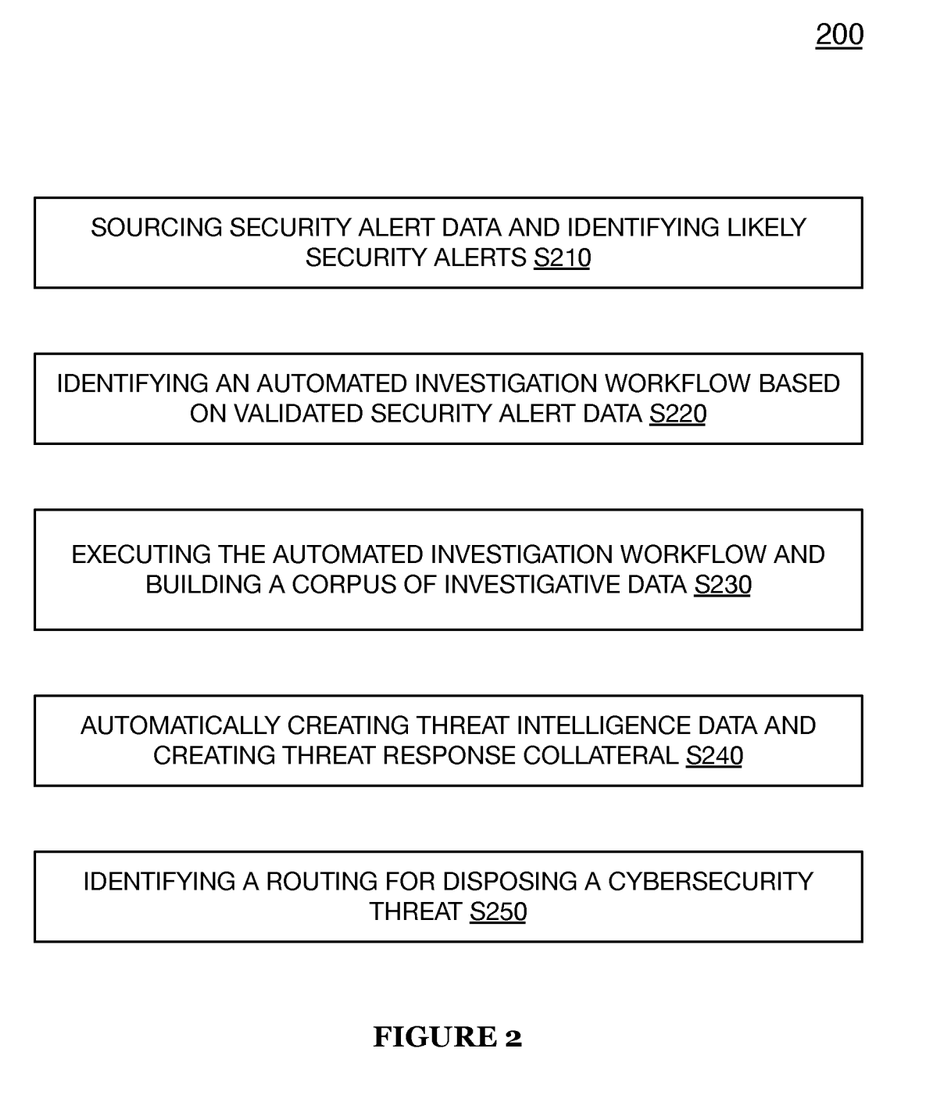
FIG. 2 illustrates an example method 200 in accordance with one or more embodiments of the present application.

2. Method for Handling Cybersecurity Events Via an Extensible Automated Investigations and Cybersecurity Threat Handling Framework As shown in FIG. 2, a method for automatically deriving actionable cybersecurity threat intelligence and mitigating cybersecurity threats via automated security investigations includes aggregating event data and identifying cybersecurity threat events and/or cybersecurity alerts S210, identifying and/or initializing an automated investigation workflow and one or more automated investigation tasks S220, executing the automated investigation workflow and the one or more automated investigation tasks S230, and automatically returning investigation data and deriving cybersecurity threat intelligence data S240.

2.1 Identifying Validated Security Alerts/Events

S210, which includes sourcing security alert data/event data and identifying likely security alerts, may function to collect or receive event data and raw security alert data from one or more distinct sources of data. In one or more embodiments, the event data and/or security alert data may include, but should not be limited to, one or more of vendor alert data, continuous telemetry data, subscriber data, investigative data, other data, and/or the like.

In a preferred embodiment, S210 may function to implement a security alert engine or the like that may function to ingest raw security alert data and/or event data, process a combination of the raw security alert data and event data, and subsequently, publish one or more likely cybersecurity threats or validated security alerts based on the processing. It shall be recognized that the terms "validated security alert" and "cybersecurity threat" may be used interchangeably herein.

In one or more embodiments, the security alert engine comprises a security alert application programming interface (API) server and/or one or more computers within a distributed network of computers. The raw security alert data, in some embodiments, preferably relate to event data or activity data occurring with or involving one or more computing resources, computer network resources, data resources, cloud-based resources, any computer accessible digital entity or device, and/or the like, which may sometimes be referred to herein as "secured digital/computing assets" and/or "security assets" of a subscribing entity or the like. In such embodiments, the security assets may be the subject of protection by one or more systems and/or services implementing the system 100 and/or the method 200.

In one or more embodiments, the security alert engine may be in web-based communication or other operable communication with a plurality of distinct event data and security alert data sources. In some embodiments, the plurality of distinct security alert data sources may include one or more third-party, web-based security services, APIs, and/or one or more digital services (e.g., an on-network security agent) operating on one or more systems of a subscriber or entity having the secured assets. In a preferred embodiment, S210 may function to periodically request or generate API calls to each of the plurality of distinct event data and/or security alert data sources for providing raw security alert data to the security alert engine or the like. Additionally, or alternatively, via intelligent data source and service system (e.g., system 100) integrations S210 may function to receive automatic pushes of raw security alert data and event data from one or more of the plurality of distinct security alert data sources.

In a preferred embodiment, S210 may function to ingest and process the raw security alert data to produce or identify likely or validated security alerts. A validated security alert or a likely security alert, as interchangeably referred to herein, preferably relates to a service-generated indication or notification of a probable or a likely event that may include a cybersecurity attack, a suspicious cyber event, a breach of cybersecurity policy and/or the like.

In a first implementation, a system and/or service implementing the method 200 may function to receive a large volume of event data and/or security alert data, which may include a large plurality of distinct security alerts and associated security alert data or distinct event data. Thus, in one or more embodiments of an operation of the security alert engine, S210 may function to extract, distill or otherwise filter security risk feature data from the large volume or the plurality of distinct security alerts and security alerts data to identify a subset of security alerts that may define a validated security alerts.

In this first implementation, S210 may function to distill or filter a volume of raw security alert data to a smaller subset of validated security alerts based on one or more of security escalation criteria, security event criteria, and a security alert validation algorithm. In one or more embodiments, the security alerts engine may implement security event criteria that includes a plurality of distinct, predetermined security threat identification heuristics or rules. In such embodiments, features of each distinct raw security alert input into or assessed by the security alert engine may be evaluated against the predetermined security threat identification heuristics and if the features of a raw security alert matches, satisfy, or otherwise, triggers a predetermined security rule, S210 may function to validate the subject raw security alert data and pass or route an associated subject raw security alert along to one or more downstream cybersecurity threat handling processes (e.g., to automated security investigations engine 120) as a validated security alert.

Figure 3:
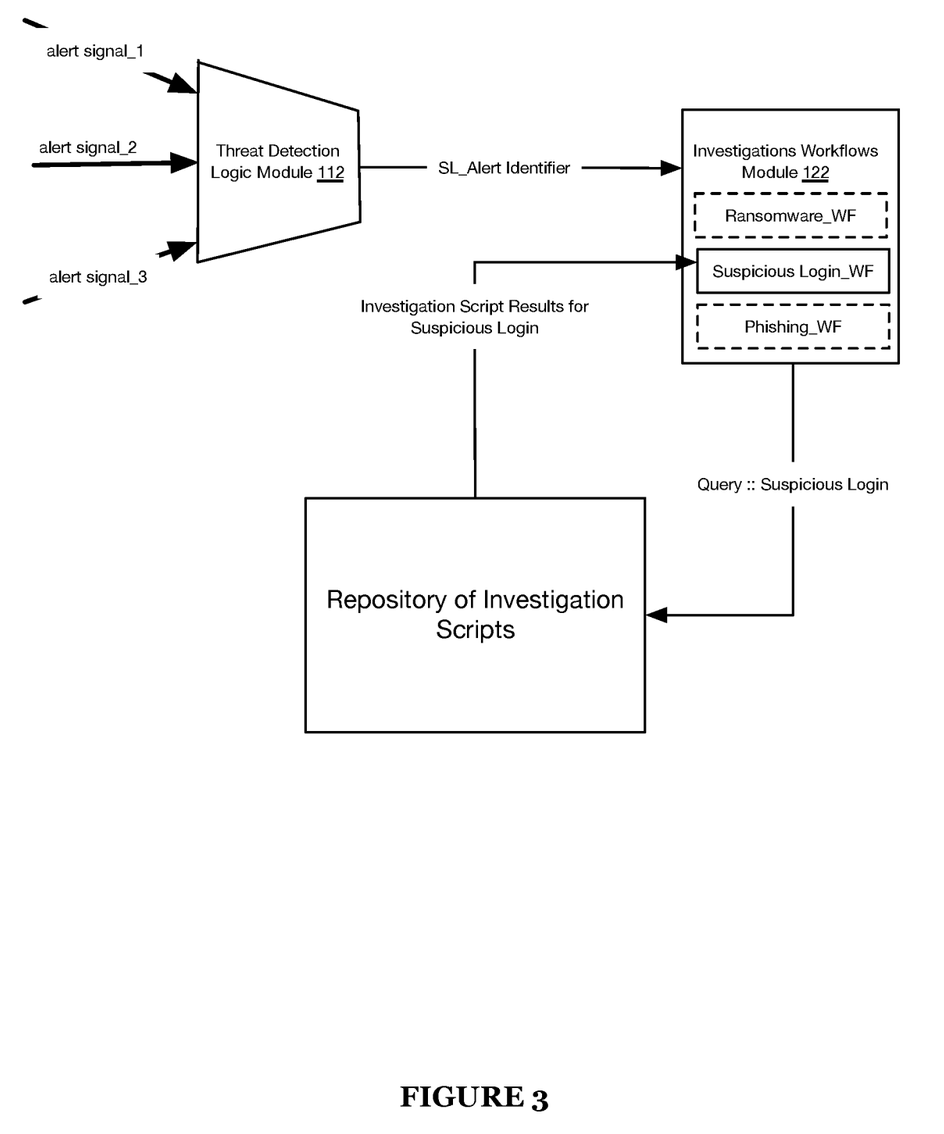
FIG. 3 illustrates a schematic representation of a first implementation of one or more sub-components of the system 100 in accordance with one or more embodiments of the present application.

Additionally, or alternatively, S210 may function to pass one or more validated security alerts computed by the security alert engine to the one or more downstream processes or operations preferably including one or more of an automated investigations engine and a security alert queue that may be electronically accessible via a security mitigation user interface, as shown by way of example by FIG. 3. In some embodiments, S210 may function to provide or write the one or more validated security alerts to each of the automated investigations engine and the security mitigation user interface contemporaneously or at a same time to enable a parallel processing and/or investigation of the one or more validated security alerts by the automated investigations engine and via the security mitigation user interface.

Additionally, or alternatively, a validated security alert may be structured as a container of security data that, in some embodiments, includes a collection of multiple distinct vendor alerts.

2.1.1 Machine Learning-Informed Security Alert Validation

Figure 4:
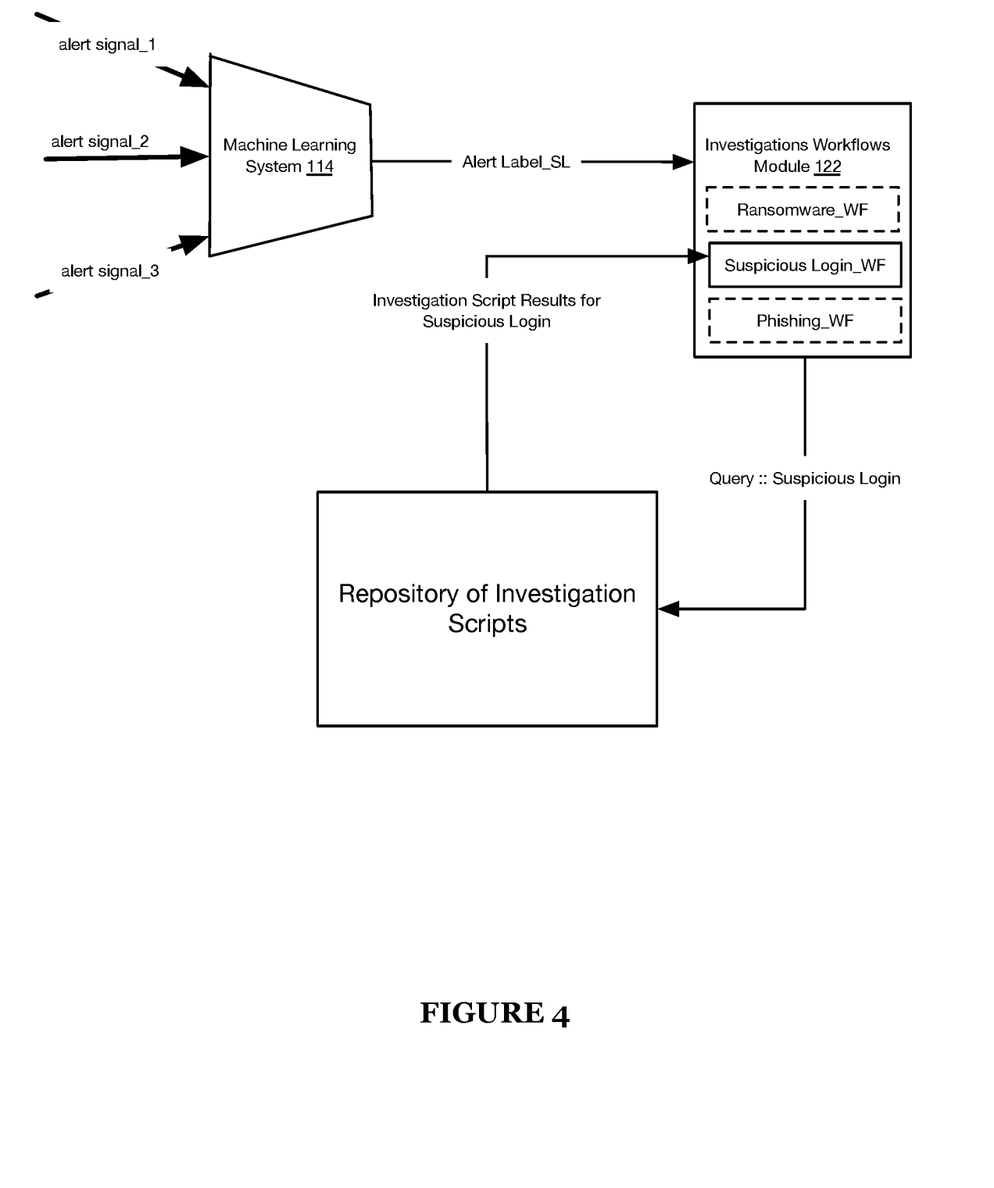
FIG. 4 illustrates a schematic representation of a second implementation of one or more sub-components of the system 100 in accordance with one or more embodiments of the present application.

In a second implementation, the security alert engine comprises one or more security alert machine learning classifiers designed and trained to identify validated security alerts and non-security alerts, as shown by way of example in FIG. 4. In such implementation, S210 may function to implement one or more security machine learning models that may classify each of distinct, inbound security alerts as either a validated security alert or a non-security alert based on security feature data associated with each security alert. In this second implementation, S210 may function to implement a feature extractor or a feature extractor system that may function to extract a feature dataset from each inbound security alert that may be converted to a feature vector dataset and used as input into the one or more security machine learning models. In such second implementation, the feature extractor system comprises a security risk feature extractor or the like that may function to extract a corpus of probative features from the large volume of event and/or security data that may be indicative of a cybersecurity event or security threat.

Accordingly, in such embodiments, the one or more machine learning models computing against a given feature dataset of a subject security alert may function to output a classification label for the subject security alert that identifies the subject security alert as a valid security alert to be set for investigation or an invalid security alert to be discarded, ignored, or passed through a less stringent investigation procedure by a service or system (e.g., system wo) implementing the method 200. It shall be recognized that the first implementation and the second implementation may be combined or integrated and performed together validated security alerts and invalid security alerts may be output based on validation criteria and by the one or more security alert machine learning models. In such embodiments, the output of either the first implementation or the second implementation may be used to substantiate or confirm the other of the first implementation and the second implementation.

2.1.2 Cybersecurity Threat Type Classification Label(s) and Identifier

Additionally, or alternatively, in either the first and/or the second implementation, S210 may function to compute and/or predict a likely cybersecurity threat type for a validated security alert. That is, in one or more embodiments, S210 may function to produce an additional classification label indicating a distinct threat type or category for a likely/validated security alert. In this way, the threat type classification label may function to inform a routing of a validated security alert for threat mitigation, which may include informing a selection and/or an initialization of an automated investigation workflow.

Additionally, or alternatively, the threat type classification label may function to inform and/or cause an update to a cybersecurity risk severity or threat severity of a given validated alert. In such embodiments, the method 200 may function to associate or map each of a plurality of distinct threat classification labels to one of a plurality of distinct threat severity levels or threat severity values. For example, a first validated alert may be predictively classified as a "breach involving sensitive data," which may be mapped to a high threat severity level or a high threat severity score (e.g., 99 out of 100) and a second validated alert may be predictively classified as a "violation of subscriber access policy," which may be mapped to a low threat severity level or a low threat severity score (e.g., 20 out of 100). In such example, a default threat severity of a given validated alert may be updated or changed based on the predict classification label for the given validated alert.

cause implicitly involve a high threat severity, and as such, a cybersecurity threat service may route the first validated alert to an escalated threat route (e.g., incident) for a scrutinized handling of the alert. In such example, a second validated alert may be classified as a "breach of subscriber access policy", which may implicitly involve a low threat severity, and as such, the cybersecurity threat service may route the second validated alert to a de-escalated threat route (e.g., rapid triage) for handling the second validated alert.

In one implementation, S210 may function to implement an ensemble of machine learning classifiers that may function to predict at least one of a plurality of distinct cybersecurity threat types for a validated security alert. In one or more embodiments, the ensemble of machine learning classifiers may include a combination of distinct machine learning classifiers in which each distinct machine learning classifier may be trained to compute a prediction of whether one distinct type of cybersecurity threat exists or not based on a feature set of a validated security alert. That is, for each distinct cybersecurity threat of a plurality of distinct cybersecurity threats that may exist or that may be recognized by a system/service implementing the method 200, the ensemble may include a distinct machine learning classifier that may be trained to make a prediction for the respective distinct cybersecurity threat. For instance, an ensemble may include a first machine learning classifier that predicts a likelihood that a validated security alert may be a "suspicious login" or not, a second machine learning classifier that predicts a likelihood that the validated security alert may be an "authorized access" to a secured computing asset, and a third machine learning classifier that predicts a likelihood that the validated security alert may be a "violation of computer security policy" by an employee or the like. In such example, each distinct machine learning classifier may function to receive the feature dataset for the validated security alert and make a prediction. In one or more embodiment, the distinct machine learning classifier of the ensemble producing a prediction with the highest probability value or confidence value may be selected or identified as the cybersecurity threat type for a target validated security alert.

Additionally, or alternatively, in some embodiments, a predicted or a computed threat type classification label for a given validated security alert may define or form part of a cybersecurity threat identifier (value) or the like. In such embodiments, the cybersecurity threat identifier may function to inform a routing or handling of an associated validated security alert. In one embodiment, S210 may function to produce an identifier that includes a first part comprising the threat type classification label and at least a second part comprising a unique alphanumeric value specific to an instance of a given validated security alert. In this way, the cybersecurity threat identifier defining metadata of a given validated security alert may be used for routing the given validated security alert as well as tracking the given validated security alert.

2.2 Automated Security Investigations: Identifying Automated Workflows

S220, which includes identifying an automated investigation workflow and one or more investigation instructions, may function to identify an automated investigation workflow based on a validated security alert. In a preferred embodiment, S220 may function to selectively activate one or more automated investigation workflows of a plurality of distinct automated investigation workflows that may be implemented for automatically handling one or more portions of a security investigation and/or cybersecurity threat associated with a subject validated security.

In one or more embodiments, an automated investigation workflow comprises a sequence and/or a collection of automated investigative actions or investigation subroutines/scripts, that when executed, perform one or more automated investigative tasks including, but not limited to, automatically sourcing security investigation data, automatically routing, and automatically constructing one or more investigation response resources for successfully supporting a decisioning and/or a disposal of a given validated security alert. That is, in or more embodiments, the one or more investigation actions or tasks may include, but should not be limited to, automated actions in identifying sources of additional security investigation data for a subject validated security alert, automated security investigation data aggregation or collection actions from each of the identified sources, an intelligent formatting and presentation or reporting of the security investigations data to one or more recipients including the security mitigation user interface or the like. Preferably, in some embodiments, a service or a system implementing the method 200 may function to implement an automated security investigation engine that automatically executes the automated investigation workflow responsive to detecting the given validated security alert.

Accordingly, in one or more embodiments, a distinct automated investigation workflow may be defined for each recognized and/or distinct threat type classification or category of a validated security alert. That is, in some embodiments, each class or distinct type of validated security alert may be mapped or electronically linked to a distinct automated investigation workflow. For instance, a first validated security alert type or distinct threat type classification may be mapped to a first (set of) automated investigation workflow(s) and a second distinct validated security alert may be mapped to a second distinct (set of) automated invention workflow(s) that may be specifically configured for automatically performing one or more investigative tasks for handling or supporting an investigative response to or an expedited disposal of the first and the second distinct validated security alerts. For example, S220 may function to generate a validated security alert for a phishing security threat that may trigger a phishing automated investigation workflow. In another example, S220 may function to generate another validated security alert for a suspicious login threat that may trigger a suspicious login automated investigation workflow.

Accordingly, in response to a machine learning-based classification (e.g., a classification label) and/or automated categorization of a validated security alert to one of a plurality of distinct cybersecurity threat types, S220 may function to use the threat type classification label or threat type categorization to inform a selection and/or automated initialization of an automated investigation workflow.

2.2.1 Investigation Instructions Discovery

In a first implementation, an automated investigation workflow may include an investigation action or an investigation subroutine for discovering or identifying a set of investigation instructions or investigation rules, that when executed, inform or identify sources of investigation data, configure and execute one or more API calls, perform an analysis of and extraction of specific investigation data, delivers and/or presents investigation results, integrates and/or merges investigation data into predetermined response templates, builds graphical illustrations of an informative aspect of the validated security alert, and/or the like based on the threat type classification or threat type categorization of the validated security alert.

In one or more embodiments, investigation data, as referred to herein, preferably relates to data, information, and/or other results obtained through an inquiry via one or more API calls or the like, an examination, and/or an inspection of a (validated) security alert that may define a scope and/or extent of the validated security alert.

In the first implementation, S220 may function to discover the set of investigation instructions based on performing a search of an investigation instructions or rules repository using data and/or cybersecurity threat type identifier data associated with a validated security alert. For instance, the automated investigation workflow may include an investigation action that includes submitting to an investigative instructions repository an investigation search query comprising a security alert identifier (e.g., suspicious_login, etc.) that seeks to find and return all investigation instructions or tasks that may include a metadata tag of "suspicious_login".

In this first implementation, investigative instructions or rules, once discovered and/or returned based on an investigative search query or the like, may function to extend the investigative tasks of a given automated investigation workflow by defining or augmenting one or more additional or new investigation actions specifically designed for a given validated security alert for the given automated investigation workflow.

Additionally, or alternatively, an investigation mapping for a given validated security alert may include a set or a corpus of investigative queries that may be resolved by an investigative analysis and/or investigative data obtained via the execution of the one or more investigation tasks of an automated investigations workflow for the given validated security alert. That is, the set or corpus of investigative queries may define one or more investigative criteria and/or questions about a validated security alert that should preferably be satisfied and/or answered based on evaluation of the investigative data obtained for the validated security alert. For instance, if a cybersecurity threat type includes a suspicious login, one or more of the investigation criteria or investigative queries for this cybersecurity threat type may include a request for a source IP address of the suspicious login. In such example, during an evaluation of the investigative data, the method 200 ay function to extract from the investigative data informative or probative pieces of data including a source IP address associated with the suspicious login.

2.2.2 Investigative Instructions Reference Source

In a second implementation, in response to obtaining or receiving a copy of validated security alert data, S220 may function to map the validated security alert directly to a corpus of investigation instructions or investigation instructions/scripts, that when executed, automatically perform one or more investigative actions for resolving the validated security alert. In this second implementation, S220 may function to implement an investigation reference source, such as a reference table or any suitable data structure, that electronically maps or links each of a plurality of distinct security alerts or distinct cybersecurity threat types to a set or a corpus of investigation instructions that may be specifically tailored for mitigating and/or resolving the associated security alert. Thus, in some embodiments, for each distinct (validated) security alert, a differentiated set of investigation instructions may be executed to generate investigation data and/or investigation responses for each distinct security alert.

2.3 Automated Investigations: Building a Corpus of Investigation Data

S230, which includes executing one or more automated investigation workflows and composing a corpus of investigation data, may function to implement one or more automated security alert investigations that source and build one or more corpora of investigation data and identifies and/or extracts threat intelligence data from the one or more corpora of investigation data.

In a preferred embodiment, S230 may function to execute each of the investigation actions of a given automated investigation workflow including investigation actions original to the automated investigation workflow and, optionally, the additional investigation actions augmenting the automated investigation workflow based on the one or more discovered investigation instructions.

Accordingly, in one or more embodiments, S230 may function to automatically execute the investigation tasks and/or actions of a given automated investigation workflow to identify sources of investigation data for a given validated security alert. In such embodiments, S230 may function to identify one or more sources of the validated security alert data, such as a third-party security vendor or security service, and may function to generate one or more investigation queries to the one or more sources requesting additional security alert information and/or details relating to the validated security alert. That is, in this embodiment, S230 the one or more sources of data used in defining or identifying a validated security alert may be identified as targets of the one or more investigative tasks and/or investigative actions of the given automated investigation workflow. In one or more embodiments, S230 may function to construct or generate the one or more investigation queries to the one or more sources based on the one or more investigation scripts or rules that may define data criteria and/or data requirements for a given cybersecurity threat type of the validated security alert. For instance, if a cybersecurity threat type includes a suspicious login, one or more of the investigation scripts or rules may define API call parameters for configuring an API call for sourcing data relating to an agent identifier and/or IP address associated with the suspected suspicious login.

In a preferred embodiment, S230 may function to implement a security investigations engine that may be programmatically (e.g., via one or more APIs) linked or in communication with a plurality of distinct sources of security data. In such preferred embodiment, S230 may function to cause the security investigations engine to generate one or more API calls for investigation data to each source of security investigation data including, but not limited to, security APIs of third-party security services or vendors and/or native security APIs or native services of a subscriber to the system or service implementing the method 200. Additionally, or alternatively, S230 may function to cause the security investigations engine to collect security investigation data from any suitable source including, but not limited to, an Active Directory and the like.

In one or more embodiments, S230 may function to access parameters for configuring API calls for sourcing cybersecurity intelligence data based on an identification of the one or more sources of investigation data. In such embodiments, each source of investigations data or cybersecurity threat data may be associated with or otherwise mapped to a set of configuration parameters or requirements for creating a successful API request to the source. Accordingly, when executing the one or more automated investigations workflows, S230 may function to access API configuration parameters for each source of investigation data and automatically configure and execute the one or more API calls based on the API configuration parameters.

Additionally, or alternatively, S230 may function to collect, store, and process investigation data based on returned responses to the one or more API calls or queries to the one or more distinct sources of security alert data. In such embodiments, S230 may function to compile the collected data into a corpus of investigation data and preferably associate the corpus of investigation data with a unique threat identifier associated with a target validated security alert.

Additionally, or alternatively, S230 may function to access or pass the compilation of investigation data to one or more intelligence gathering and/or derivation modules that preferably function to evaluate the corpus of investigation data and derive actionable cybersecurity intelligence data, as described in more detail below.

2.4 Deriving Cybersecurity Threat Intelligence & Threat Response Routing

S240, which includes automatically deriving cybersecurity threat intelligence data and automatically creating threat response collateral, may function to evaluate the corpus of investigation data and derive cybersecurity threat intelligence data based on the evaluation. Additionally, or alternatively, S240 may function to generate, via a security investigation user interface, one or more security threat response collateral based on integrating and/or interleaving pieces of the cybersecurity threat intelligence data into one or more pre-fabricated threat intelligence reports, as disclosed in U.S. Patent Application No. 63/153,693, which is incorporated herein in its entirety by this reference.

Cybersecurity Intelligence Data Derivation

In one or more embodiments, the one or more automated investigation workflows may include one or more investigative tasks, that when executed, automatically derive cybersecurity intelligence data. In a preferred embodiment, cybersecurity threat intelligence data may include a subset of data selectively extracted from the corpus of investigation data and/or one or more investigative insights derived from the subset of data. In one or more embodiments, S240 may function to perform an evaluation and/or analysis of the investigation data for identifying and extracting informative and/or probative pieces of data from the corpus of investigation data.

In one or more embodiments, an evaluation of the investigation data may include evaluating one or more parts of the corpus of investigation data to identify one or more pieces of informative data or probative data that may satisfy the one or more investigative criteria of the one or more automated investigation workflows associated with or being executed for a target validated security alert. In such embodiments, the investigative criteria may indicate to and/or inform a system or a service implementing the method 200 which pieces of data of the investigative corpus that may satisfy one or more requirements for information for a cybersecurity threat type of a given validated security alert. To this end, S240 may function to evaluate the corpus of investigation data to locate and extract the information or pieces of data from the corpus of investigation data that match and/or satisfy the requirements for information of the investigative criteria. For example, for a cybersecurity threat type of "suspicious_login", S240 may function to extract an IP address value from a corpus of investigation data for satisfying an investigative requirement for source location data for the cybersecurity threat type of "suspicious_login".

Accordingly, the one or more investigative criteria of a given automated investigation workflow may inform the probative pieces of data to be extracted from a corpus of investigation data. Therefore, S240 may function to extract features or pieces of data from the corpus of investigation data that satisfy requirements for responding to the one or more investigative criteria of a given automated investigation workflow and derive the cybersecurity intelligence data based on a compilation of the extracted features or pieces of data from the corpus of investigation data.

Additionally, or alternatively, S40 may function to automatically construct rationale or reasonings underpinning a threat disposal decision (e.g., escalation or de-escalation of a validated security alert, as described in more detail in S250). In one or more embodiments, S240 may function to analyze the cybersecurity threat intelligence data and derive insights and rationale supporting an escalation or a de-escalation of a given validated alert based on identifying select probative and/or informative pieces of data from within the threat intelligence dataset. As a non-limiting example, in some embodiments, S240 may function to implement a mapping between select probative feature data types and one or more likely rationale that explain how the select feature data types influence an escalation or a de-escalation decision for a given validated security alert. In such example, S240 may function to automatically perform rationale lookups for each or a combination of probative feature data for a given validated security alert and publish the rationale or reasonings returned for supporting either an escalation or a de-escalation of the given validated security alert.

Cybersecurity Threat Severity Metric

Additionally, or alternatively, the one or more automated investigation workflows may include one or more investigative tasks, that when executed (by a computer or the like), automatically compute a cybersecurity threat severity metric ("threat severity metric"). In one or more embodiments, S240 may function to compute a threat severity metric based on computation inputs extracted from the cybersecurity threat intelligence data. A threat severity metric, as referred to herein, preferably relates to a predicted or a computed likelihood or estimation that a target validated security alert includes a malicious attack and/or a compromise of one or more of the computing systems of a subscriber, and/or a violation of computer security policy of the subscriber.

In one embodiment, a threat severity metric for a target validated security alert comprises a threat severity score or threat severity value. In such embodiment, the threat severity score or value may be set between any two values in a range, such as a value including and/or between 0 and 100 or A to Z and the like. In some embodiments, the threat severity metric comprises a threat designation (e.g., Red, Green, Yellow, etc.), or a threat level (e.g., Level 1, Level 2, etc.) which informs a degree of threat risk associated with a target validated security alert.

In a first implementation, S240 may function to compute a cybersecurity threat severity metric for a target validated security alert based on predictive inferences of one or more trained machine learning models. In this first implementation, an algorithmic structure of the one or more trained machine learning models may include a plurality of learnable variables and/or weighted variables informed by threat features of one or more distinct cybersecurity threat types. For instance, the algorithmic of one or more trained machine learning models may include one or more learnable variables defined by data features that map to or indicate a "suspicious_login" threat type. As a non-limiting example, one or more of the learnable variables of a given model may relate to and/or take into account a perceived need for urgency in producing a fast response (e.g., an escalation to an incident and/or a high risk event or the like) to the target validated security alert. Thus, in such example, an urgency factor may be computed (implicitly) by the one or more trained machine learning models based on identifying threat features that infer an urgency of a given cybersecurity threat or risk of the validated security alert.

In one or more embodiments, S240 may function to implement a single, global machine learning model having an algorithmic structure that includes a composition of learnable variables that may be defined by threat features of a plurality of distinct cybersecurity threat types. That is, the algorithmic structure of the global machine learning models may include learnable variables for predicting a cybersecurity threat score for multiple distinct cybersecurity threat types.

In one or more embodiments, S240 may function to implement an ensemble of machine learning models that includes a plurality of distinct machine learning models. In such embodiments, the ensemble of machine learning models may include at least one distinctly trained machine learning model for each distinct cybersecurity threat type of a plurality of distinct cybersecurity threat types. Accordingly, the ensemble of machine learning models may function to produce a plurality of distinct cybersecurity threat scores for a given validated security alert.

Automated Threat Intelligence Report Generation

Additionally, or alternatively, the one or more automated investigation workflows may include one or more investigative tasks, that when executed (by a computer or the like), automatically create cybersecurity threat intelligence collateral ("threat intelligence collateral") for handling a given validated security alert. In one or more embodiments, S240 may function to automatically create threat intelligence collateral based on cybersecurity threat intelligence data. In such embodiments, executing one or more investigative tasks, may function to automatically perform an integrating of select cybersecurity intelligence data into one or more pre-fabricated pieces of collateral. As a non-limiting example, S240 may function to merge or populate one or more portions of a corpus of investigation data and/or cybersecurity intelligence data into one or more sections of a cybersecurity threat reporting template or reporting document. In such embodiments, S240 may function to intelligently format the cybersecurity threat intelligence data and/or investigation analysis data into one or more data structures that may be presented or otherwise, displayed via the investigation reporting document.

In some embodiments, S240 may function to automatically and progressively populate or merge the cybersecurity intelligence data and/or the investigation analysis data into a cybersecurity threat reporting document as the cybersecurity threat intelligence data and/or the investigation analysis data may be collected, computed or generated by a security investigation engine or the like.

Additionally, or alternatively, S240 may function to construct one or more sections within a cybersecurity threat reporting document based on one or more investigation queries associated with the one or more automated investigation workflows for a subject validated security alert. In such embodiments, S240 may function to intelligently format the cybersecurity threat reporting document to include sections led by a distinct investigation query that is followed with corresponding cybersecurity threat intelligence data and investigation analysis data that satisfy the distinct investigation query.

Additionally, or alternatively, S240 may function to automatically construct one or more graphical illustrations based on cybersecurity threat data and incorporate each of the one or more graphical illustrations into the cybersecurity threat reporting document. In some embodiments, the one or more graphical illustrations or illustrative schematics may be selectable for returning to the cybersecurity threat reporting document the underlying cybersecurity threat data defining the one or more graphical illustrations.

2.5 Cybersecurity Threat Routing & Mitigation

S250, which includes identifying a routing for disposing of a cybersecurity threat, may function to identifying a threat mitigation route or a threat disposal route based on the cybersecurity intelligence data. In a preferred embodiment, a system and/or service implementing the method 200 may include a plurality of distinct threat mitigation and/or threat disposal routes for handling and/or remediating a validated security alert or cybersecurity threat. In one or more embodiments, the plurality of distinct threat mitigation and/or threat disposal routes may include, but should not be limited to, a first route for escalating the validated security alert to a confirmed state of malicious attack or incident, a second route for informing a subscriber regarding a threat risk state of the validated security alert, and a third route for de-escalating the validated security alert to a determined state of non-malicious thereby informing a termination state for a validated security alert. In one or more embodiments, a state and/or a determined route for a given validated security alert may be represented and/or provided via a security threat mitigation user interface. It shall be recognized that the routes may include any suitable number or type of routes that be different than the above-mentioned routes.

In a first implementation, an evaluation of one or more security alerts may function to inform a routing decision for a given validated security alert. In this first implementation, S250 may function to evaluate the cybersecurity threat intelligence data including circumstances and details associated with the given validated security alert. For example, the cybersecurity threat intelligence data for a target validated security alert may include an indication of one or more of a root cause of the validated security alert, an identification of a state (e.g., active or dynamic threat) of the validated security alert, and/or a cybersecurity threat severity of the validated security alert. Accordingly, based on the evaluation of the cybersecurity threat intelligence data and/or reports, S250 may function selectively prescribe one of a plurality of distinct threat mitigation and/or threat handling routes to a given validated security alert that enables one or more of an escalation for handling the validated security alert or immediately executing a disposal or triage of the validated security alert.

In a second implementation, a cybersecurity threat metric may inform a routing decision for a given validated security alert. In this second implementation, if the cybersecurity threat metric comprises a cybersecurity (machine learning-based) threat score or the like, S250 may function to evaluate the cybersecurity threat score against one or more threat routing thresholds that, if satisfied, identifies a threat mitigation or a threat disposal route for the given validated security alert. In this second implementation, a system and/or service implementing the method 200 may function to implement a plurality of distinct threat routing thresholds that may each be distinctly mapped to or associated with a distinct threat route and that each have non-overlapping threat score ranges (e.g., route_1: 0-40, route_2: 41-80, route_3: 81-100, etc.), such that if a cybersecurity threat score satisfies and/or falls within a non-overlapping threat score range of a distinct threat routing threshold, S250 may function to prescribe to the validated security alert the associated distinct threat route of the distinct threshold routing threshold. For instance, one or more of the threat routing thresholds may include a threat escalation threshold for a threat escalation route, a threat de-escalation threshold for a threat de-escalation route, and a threat notice threshold for a threat notice route, where each routing threshold is distinct and includes an evaluative range that is non-overlapping with over evaluative ranges. It shall be recognized that, in some embodiments, the routing thresholds may be a set minimum threat value or a set maximum threat value.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for accelerating a remediation or disposal of a cybersecurity event, the method comprising:
   producing a plurality of automated investigation tasks based on detecting a cybersecurity event, wherein producing each of the plurality of automated investigation tasks includes:
      (i) identifying a set of application programming interface (API) call parameters associated with a target external data source, and
      (ii) configuring one or more API calls based on the set of API call parameters of the target external data source;
   generating a corpus of investigation findings data associated with the cybersecurity event based on executing the plurality of automated investigation tasks;
   configuring a cybersecurity investigation findings artifact based on one or more pieces of cybersecurity threat-informative data included in the corpus of investigation findings data, wherein the cybersecurity investigation findings artifact includes one or more pieces of threat intelligence collateral that informs one or more threat mitigation responses to the cybersecurity event or informs a de-escalation response to the cybersecurity event; and
   executing one or more cybersecurity event handling actions or one or more cybersecurity event disposal actions that resolve or mitigate a threat of the cybersecurity event based on an assessment of the cybersecurity investigation findings artifact.

2. The method according to claim 1, wherein:
   configuring the cybersecurity investigation findings artifact includes:
      automatically interleaving a selected subset of the one or more pieces of cybersecurity threat-informative data into one or more sections of the cybersecurity investigation findings artifact.

3. The method according to claim 1, wherein:
   configuring the cybersecurity investigation findings artifact includes:
      automatically creating one or more illustrative threat graphics of the cybersecurity event based on a select subset of the one or more pieces of cybersecurity threat-informative data, and
      installing the one or more illustrative threat graphics into a target region of the cybersecurity investigation findings artifact.

4. The method according to claim 1, wherein:
   at least one of the plurality of automated investigation tasks corresponds to a target investigative query; and
   a subset of the one or more pieces of cybersecurity threat-informative data satisfies the target investigative query.

5. The method according to claim 4, wherein:
   a distinct section of the cybersecurity investigation findings artifact includes:
      the target investigative query; and
      the subset of the one or more pieces of cybersecurity threat-informative data; and
   the target investigative query is positioned ahead of each piece of cybersecurity threat-informative data of the subset within the distinct section.

6. The method according to claim 4, wherein:
   a distinct section of the cybersecurity investigation findings artifact includes:
      the target investigative query; and
      the subset of the one or more pieces of cybersecurity threat-informative data; and
   each piece of cybersecurity threat-informative data of the subset is positioned below the target investigative query within the distinct section.

7. The method according to claim 1, wherein:
   at least one of the plurality of automated investigation tasks corresponds to a target investigative question;
   a subset of the one or more pieces of cybersecurity threat-informative data of the corpus of investigation findings data satisfies the target investigative question;
   a target section of the cybersecurity investigation findings artifact includes:
      the target investigative question; and
      the subset of the one or more pieces of cybersecurity threat-informative data, wherein each piece of cybersecurity threat-informative data of the subset is positioned below the target investigative question within the target section.

8. A computer-implemented method comprising:
   initializing an ensemble of automated investigation tasks based on detecting cybersecurity activity, wherein the ensemble of automated investigation tasks is electronically linked to a likely cybersecurity activity type associated with the cybersecurity activity;
   obtaining a corpus of investigation findings data based on executing the ensemble of automated investigation tasks;
   configuring threat response collateral based on one or more pieces of cybersecurity threat-informative data included in the corpus of investigation findings data, wherein the threat response collateral informs one or more threat mitigation responses to the cybersecurity activity or informs a de-escalation response to the cybersecurity activity; and
   routing the cybersecurity activity to one of a plurality of distinct threat mitigation or threat disposal routes based on an assessment of the threat response collateral.

9. The computer-implemented method according to claim 8, wherein:

the cybersecurity activity includes one of a cybersecurity alert or a cybersecurity event.

10. The computer-implemented method according to claim 8, wherein:
the assessment includes:
computing a probable cybersecurity threat severity value associated with the cybersecurity activity based on extracting selective pieces of data from the one or more pieces of cybersecurity threat-informative data; and
the probable cybersecurity threat severity value informs the routing of the cybersecurity activity to the one of the plurality of distinct threat mitigation or threat disposal routes.

11. The computer-implemented method according to claim 10, wherein:
the probable cybersecurity threat severity value relates to a likelihood or an estimation that the cybersecurity activity includes one or more of a malicious attack, a compromise of one or more computing systems of a subscriber, and a violation of computer security policy of the subscriber.

12. The computer-implemented method according to claim 8, wherein:
initializing the ensemble of automated investigation tasks includes:
identifying a reference mapping between each of a plurality of distinct likely cybersecurity activity types and a plurality of distinct automated investigation tasks; and
identifying the ensemble of automated investigation tasks for the cybersecurity activity based on evaluating the likely cybersecurity activity type against the reference mapping.

13. The computer-implemented method according to claim 8, wherein:
initializing the ensemble of automated investigation tasks includes:
identifying a reference mapping between each of a plurality of distinct cybersecurity activities and one or more distinct automated investigation tasks; and
identifying the ensemble of automated investigation tasks for the cybersecurity activity based on performing a search of the reference mapping using the likely cybersecurity activity type associated with the cybersecurity activity.

14. The computer-implemented method according to claim 8, wherein:
configuring the threat response collateral includes composing an investigation intelligence artifact by:
automatically interleaving a subset of the one or more pieces of cybersecurity threat-informative data into one or more distinct parts of the investigation intelligence artifact.

15. The method according to claim 8, wherein:
configuring the threat response collateral further includes composing an investigation intelligence artifact by:
automatically creating one or more illustrative graphics of the cybersecurity activity based on a subset of the one or more pieces of cybersecurity threat-informative data, and
installing the one or more illustrative graphics into one or more target locations within the investigation intelligence artifact.

16. A method for accelerating a remediation or disposal of a cybersecurity event, the method comprising:
producing a plurality of automated investigation tasks based on a target cybersecurity event, wherein producing each of the plurality of automated investigation tasks includes:
configuring one or more API calls based on a set of API call configuration parameters associated with one or more external data sources;
generating a corpus of investigation findings data associated with the target cybersecurity event based on executing the plurality of automated investigation tasks;
configuring a cybersecurity investigation findings artifact based on one or more pieces of cybersecurity threat-informative data included in the corpus of investigation findings data, wherein the cybersecurity investigation findings artifact includes one or more pieces of threat intelligence collateral that informs one or more threat mitigation responses to the target cybersecurity event or informs a de-escalation response to the target cybersecurity event; and
routing the target cybersecurity event to one of a plurality of distinct threat mitigation or threat disposal routes based on an assessment of the threat response collateral.

17. The method according to claim 16, further comprising:
computing a probable cybersecurity threat severity value associated with the target cybersecurity event based on extracting selective pieces of data from the one or more pieces of cybersecurity threat-informative data; and
automatically routing the target cybersecurity event to a threat escalation route of the plurality of distinct threat mitigation or threat disposal routes when the probable cybersecurity threat severity value satisfies a threat escalation threshold.

18. The method according to claim 16, further comprising:
computing a probable cybersecurity threat severity value associated with the target cybersecurity event based on extracting selective pieces of data from the one or more pieces of cybersecurity threat-informative data; and
automatically routing the target cybersecurity event to a threat de-escalation route of the plurality of distinct threat mitigation or threat disposal routes when the cybersecurity threat severity value satisfies a threat de-escalation threshold.

19. The method according to claim 16, wherein:
at least one of the plurality of automated investigation tasks corresponds to a target investigative question; and
a subset of the one or more pieces of cybersecurity threat-informative data of the corpus of investigation findings data satisfies the target investigative question.

20. The method according to claim 19, wherein:
a distinct section of the cybersecurity investigation findings artifact includes:
the target investigative question; and
the subset of the one or more pieces of cybersecurity threat-informative data that satisfies the target investigative question; and
the target investigative question precedes each piece of cybersecurity threat-informative data of the subset within the distinct section.

* * * * *